US010425132B2

(12) United States Patent
Kahrizi et al.

(10) Patent No.: US 10,425,132 B2
(45) Date of Patent: Sep. 24, 2019

(54) CONFIGURABLE RECEIVER ARCHITECTURE FOR CARRIER AGGREGATION WITH MULTIPLE-INPUT MULTIPLE-OUTPUT

(71) Applicant: Avago Technologies International Sales Pte. Limited, Singapore (SG)

(72) Inventors: Masoud Kahrizi, Irvine, CA (US); Alireza Tarighat Mehrabani, Laguna Beach, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/953,814

(22) Filed: Apr. 16, 2018

(65) Prior Publication Data

US 2018/0302127 A1   Oct. 18, 2018

Related U.S. Application Data

(60) Continuation of application No. 14/994,808, filed on Jan. 13, 2016, now Pat. No. 9,948,363, which is a division of application No. 14/144,043, filed on Dec. 30, 2013, now Pat. No. 9,270,303.

(51) Int. Cl.
*H04B 7/0413* (2017.01)
*H04B 7/06* (2006.01)
*H04B 1/00* (2006.01)
*H04W 88/06* (2009.01)

(52) U.S. Cl.
CPC ......... *H04B 7/0413* (2013.01); *H04B 1/0067* (2013.01); *H04B 7/0689* (2013.01); *H04W 88/06* (2013.01)

(58) Field of Classification Search
CPC .. H04B 1/0067; H04B 7/0413; H04B 7/0689; H04W 88/06; A01N 37/36
USPC ..... 455/77, 73, 275, 313, 79, 323, 311, 103, 455/126, 234, 78, 450; 370/542, 329, 370/343, 68, 63, 69, 70, 332; 375/229, 375/316, 322, 345

See application file for complete search history.

(56) References Cited

U.S. PATENT DOCUMENTS

| | | |
|---|---|---|
| 5,774,705 A | 6/1998 | Leshem |
| 6,177,845 B1 | 1/2001 | Moll |
| 6,405,025 B1 * | 6/2002 | Keski-Mattinen ..... H04B 1/005 455/266 |
| 8,132,214 B2 | 3/2012 | Petruzzelli |
| 8,306,157 B2 | 11/2012 | Seendripu et al. |
| 8,879,983 B2 | 11/2014 | Yun et al. |
| 9,197,381 B2 * | 11/2015 | Kahrizi ..................... H04L 5/00 |
| 9,236,985 B2 | 1/2016 | Chen et al. |

(Continued)

*Primary Examiner* — Tan H Trinh
(74) *Attorney, Agent, or Firm* — Sterne, Kessler, Goldstein & Fox P.L.L.C.

(57) ABSTRACT

A wireless communication system and method that includes configurable Carrier Aggregation (CA) and/or Multiple-input Multiple-output (MIMO) operational modes. In CA, multiple carriers (i.e., channel bundling) are aggregated and jointly used for transmission to/from a single terminal. Downlink inter-band carrier aggregation increases the downlink data rates by routing two signals, received in different frequency bands, simultaneously to two active receivers in the RF transceiver. MIMO utilizes two additional receivers as diversity paths and the frequency generation can be shared between main and diversity path for each carriers.

20 Claims, 7 Drawing Sheets

(56) References Cited

U.S. PATENT DOCUMENTS

| | | |
|---|---|---|
| 9,356,711 B2 * | 5/2016 | Kahrizi .................. H04B 17/21 |
| 9,362,958 B2 * | 6/2016 | Gudem ................ H04B 1/0057 |
| 9,948,363 B2 | 4/2018 | Kahrizi et al. |
| 2002/0177465 A1 | 11/2002 | Robinett |
| 2002/0193146 A1 | 12/2002 | Wallace et al. |
| 2003/0129960 A1 * | 7/2003 | Kato ........................ H04B 1/18 455/334 |
| 2003/0203743 A1 * | 10/2003 | Sugar ..................... H04B 1/005 455/550.1 |
| 2004/0014435 A1 | 1/2004 | Woo et al. |
| 2004/0022215 A1 | 2/2004 | Okuhata et al. |
| 2004/0033787 A1 * | 2/2004 | Weber ......................... H04B 7/04 455/78 |
| 2004/0038651 A1 | 2/2004 | Okuhata |
| 2004/0121753 A1 * | 6/2004 | Sugar ..................... H04B 1/005 455/333 |
| 2006/0035640 A1 | 2/2006 | Karaoguz et al. |
| 2006/0035653 A1 | 2/2006 | Karaoguz et al. |
| 2006/0084469 A1 * | 4/2006 | Malone ................ H04B 1/0053 455/552.1 |
| 2006/0171482 A1 | 8/2006 | Trachewsky |
| 2006/0264184 A1 | 11/2006 | Li et al. |
| 2007/0066278 A1 * | 3/2007 | Hong ..................... H04B 1/006 455/405 |
| 2007/0072561 A1 | 3/2007 | Weber et al. |
| 2008/0132192 A1 | 6/2008 | Lim |
| 2009/0102740 A1 | 4/2009 | Rofougaran |
| 2009/0238249 A1 * | 9/2009 | van Waasen ......... H04B 7/0691 375/219 |
| 2009/0276639 A1 | 11/2009 | Saha et al. |
| 2010/0183066 A1 | 7/2010 | Chen et al. |
| 2010/0227567 A1 | 9/2010 | Dinan et al. |
| 2010/0260235 A1 | 10/2010 | Yoshii et al. |
| 2010/0290553 A1 | 11/2010 | Li et al. |
| 2010/0304703 A1 | 12/2010 | Han et al. |
| 2011/0013712 A1 | 1/2011 | Martin et al. |
| 2011/0124290 A1 | 5/2011 | Lou et al. |
| 2012/0076229 A1 | 3/2012 | Brobston et al. |
| 2012/0142396 A1 | 6/2012 | Taek-Kyun et al. |
| 2012/0213149 A1 | 8/2012 | Chakraborty et al. |
| 2013/0043946 A1 * | 2/2013 | Hadjichristos ....... H04B 1/0057 330/252 |
| 2013/0116005 A1 | 5/2013 | Ganti et al. |
| 2013/0176913 A1 | 7/2013 | Niskanen et al. |
| 2013/0217398 A1 | 8/2013 | Winiecki et al. |
| 2013/0230080 A1 * | 9/2013 | Gudem ................ H04B 1/0057 375/219 |
| 2013/0303097 A1 | 11/2013 | Sasho |
| 2013/0316670 A1 * | 11/2013 | Tasic ........................ H03G 3/20 455/234.1 |
| 2013/0336242 A1 * | 12/2013 | Rajagopal ......... H04W 72/0453 370/329 |
| 2014/0072001 A1 * | 3/2014 | Chang ................. H04B 1/0064 370/542 |
| 2014/0113573 A1 * | 4/2014 | Khatri ................... H03F 1/0277 455/78 |
| 2014/0113578 A1 | 4/2014 | Xu et al. |
| 2014/0148152 A1 | 5/2014 | Periyalwar et al. |
| 2014/0169243 A1 * | 6/2014 | Khlat ..................... H04B 7/0602 370/297 |
| 2014/0170999 A1 * | 6/2014 | Aparin ..................... H03G 3/00 455/132 |
| 2014/0179251 A1 | 6/2014 | Persico et al. |
| 2014/0233672 A1 | 8/2014 | Campos et al. |
| 2014/0248862 A1 | 9/2014 | Periyalwar et al. |
| 2014/0348274 A1 * | 11/2014 | Youssef ................... H03G 3/20 375/345 |
| 2014/0349701 A1 | 11/2014 | Vajapeyam et al. |
| 2014/0355526 A1 * | 12/2014 | Kahrizi ...................... H04L 5/00 370/329 |
| 2014/0355527 A1 | 12/2014 | Vaidya et al. |
| 2015/0035600 A1 * | 2/2015 | Jin .......................... H03F 1/565 330/277 |
| 2015/0087245 A1 | 3/2015 | Hadji-Abdolhamid et al. |
| 2015/0180694 A1 | 6/2015 | Bellaouar |
| 2015/0188582 A1 | 7/2015 | Kahrizi et al. |
| 2015/0201326 A1 | 7/2015 | Kazmi et al. |
| 2015/0214955 A1 | 7/2015 | Calhoun et al. |
| 2016/0315643 A1 * | 10/2016 | van der Tang ....... H04B 1/0064 |
| 2017/0040947 A1 * | 2/2017 | Chang ..................... H04B 1/006 |
| 2017/0105184 A1 * | 4/2017 | Kim ....................... H03G 3/3036 |

\* cited by examiner

CONFIGURABLE RECEIVER ARCHITECTURE FOR CARRIER AGGREGATION WITH MULTIPLE-INPUT MULTIPLE-OUTPUT

CROSS REFERENCE TO RELATED APPLICATIONS

This application is a continuation of U.S. patent application Ser. No. 14/994,808, filed on Jan. 13, 2016, which is a divisional of U.S. patent application Ser. No. 14/144,043, filed Dec. 30, 2013, both of which are incorporated herein by reference in their entirety.

TECHNICAL FIELD

This application relates generally to wireless communication, and more particularly to configurable multiple-input multiple-output (MIMO) systems.

BACKGROUND

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The exemplary wireless communication environments described below provide wireless communication of information, such as one or more commands and/or data, between two or more wireless communication devices. The wireless communication devices may each be implemented as a standalone or a discrete device, such as a mobile telephone or mobile telephone peripheral device (e.g., Bluetooth headset), or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The wireless communication devices are capable of both wireless transmission and wireless reception utilizing one or more various cellular protocols specified in the International Mobile Telecommunications-2000 (IMT-2000) standard, developed by the 3rd Generation Partnership Project (3GPP) and/or the $3^{rd}$ Generation Partnership Project 2 (3GPP2), including, for example, the Long-Term Evolution (LTE) standard and/or the LTE-Advanced standard, and/or one or more various wireless communication protocols, such as Wi-Fi (IEEE 802.11), Bluetooth, Near-field Communication (NFC) (ISO/IEC 18092), WiMax (IEEE 802.16), ZigBee (IEEE 802.15.4) to provide some examples. Each of these various protocols/standards is incorporated herein by reference in its entirety.

The exemplary wireless communication environments can use multi-antenna techniques that include multiple antennas at the transmitter, receiver, and/or transceiver. The multi-antenna techniques can be grouped into three different categories: diversity, interference suppression, and spatial multiplexing. These three categories are often collectively referred to as Multiple-input Multiple-output (MIMO) communication even though not all of the multi-antenna techniques that fall within these categories require at least two antennas at both the transmitter and receiver.

In exemplary embodiments, the multi-antenna configurations can also implement Carrier Aggregation (CA). CA is a feature of Release-10 of the 3GPP LTE-Advanced standard, which allows multiple resource blocks from/to multiple respective serving cells to be logically grouped together (aggregated) and allocated to the same wireless communication device. The aggregated resource blocks are known as component carriers (CCs) in the LTE-Advanced standard. Each of the wireless communication devices may receive/transmit multiple component carriers simultaneously from/to the multiple respective serving cells, thereby effectively increasing the downlink/uplink bandwidth of the wireless communication device(s). The term "component carriers (CCs)" is used to refer to groups of resource blocks (defined in terms or frequency and/or time) of two or more RF carriers that are aggregated (logically grouped) together.

There are various forms of Carrier Aggregation (CA) as defined by Release-10 of the LTE-Advanced standard, including intra-band adjacent CA, intra-band non-adjacent CA, and inter-band CA. In intra-band adjacent CA, aggregated component carriers (CCs) are within the same frequency band and adjacent to each other forming a contiguous frequency block. In intra-band non-adjacent CA, aggregated CCs are within the same frequency band but are not adjacent to each other. In inter-band CA, aggregated CCs are in different frequency bands.

Release-10 of the LTE-Advanced standard allows a maximum of five CCs to be allocated to a wireless communication device at any given time. CCs can vary in size from 1.4 to 20 MHz, resulting in a maximum bandwidth of 100 MHz that can be allocated to the wireless communication device in the downlink/uplink. The allocation of CCs to the wireless communication device is performed by the network and is communicated to the wireless communication device.

Although the exemplary embodiments are described with respect to the LTE standard, a person of ordinary skill in the relevant art(s) will understand that the exemplary embodiments are not limited to the LTE standard and can be applied to other wireless or wired communication standards, including, for example, one or more of the wireless protocols/standards described above, and/or one or more cable networks (e.g., DOCSIS) and/or one or more optical networks (e.g., EPON, EPoC, GPON).

Figure 1:
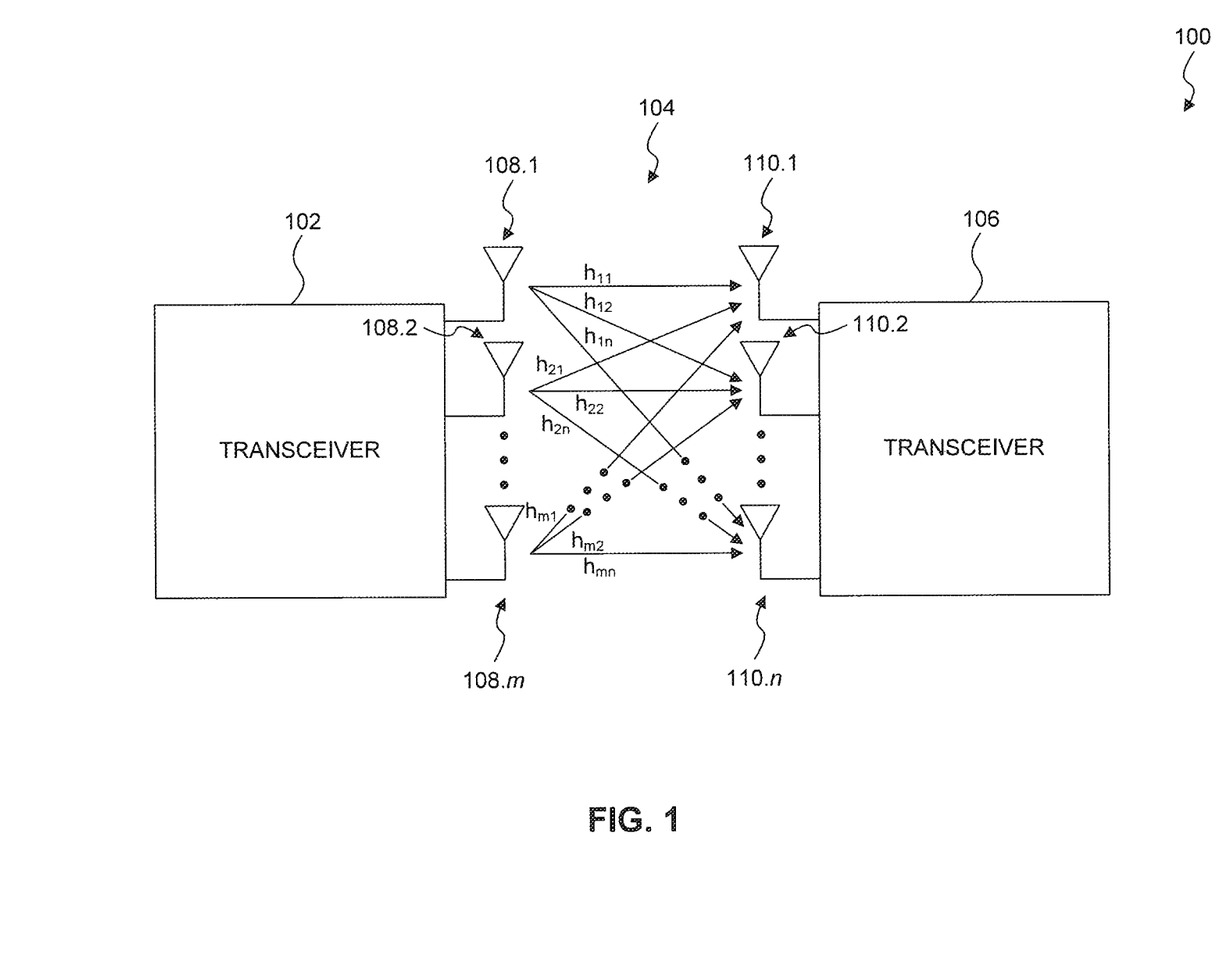
FIG. 1 illustrates a communication environment in accordance with an exemplary embodiment of the present disclosure.

FIG. 1 illustrates an exemplary communication environment 100 according to an exemplary embodiment of the present disclosure. The communication environment 100 includes a communication transceiver 102 to transmit/receive one or more data streams to/from a communication transceiver 106 via a communication channel 104 utilizing Multiple-input Multiple-output (MIMO) and/or Carrier Aggregation (CA) configurations. For the purposes of this discussion, the operation of the communication transceivers 102 and 106 will be described with the communication transceiver 102 transmitting one or more data streams to the communication transceiver 106. However, as will be appreciated by those skilled in the relevant art(s), the communication transceiver 106 can also be configured to transmit one or more data streams to the communication transceiver 102.

The communication transceiver 102 provides multiple parallel data streams by operating upon the one or more data streams to provide multiple parallel data streams. The communication transceiver 102 provides the multiple parallel data streams to multiple transmit antennas 108.1 through 108.$m$ for transmission over the communication channel 104 to the communication transceiver 106. The communication transceiver 102 can represent a transmitter of a base station (BS), a femtocell, or user equipment (UE). Similarly, the communication transceiver 106 can represent a receiver of a base station, a femtocell, or user equipment. It some situations, multiple MIMO communication environments 100 can be used within a communications network. For example, a first MIMO communication environment 100 can represent a downlink (DL) between a base station and a user equipment of a wireless communication network and a second MIMO communication environment 100 can represent an uplink (UL) between the user equipment and the base station of the wireless communication network. Alternatively, or in addition to, the MIMO communication environment 100 can be implemented in conjunction with various non-MIMO communication environments, such as legacy LTE 3-4G to provide an example, to facilitate communication between communication devices.

The communication transceiver 106 observes the multiple parallel data streams using the multiple receive antennas 110.1 through 110.$n$ as the multiple parallel data streams traverse through various communication pathways of the communication channel 104 to provide multiple observed parallel data streams. The communication transceiver 106 can operate upon the multiple observed parallel data streams to provide one or more recovered data streams.

The various communication pathways of the communication channel 104 represent various communication pathways between each of the multiple transmit antennas 108.1 through 108.$m$ and a corresponding one of the multiple receive antennas 110.1 through 110.$n$. For example, the receive antenna 110.1 observes the multiple parallel data streams over communication pathways $h_{11}$, $h_{21}$, and $h_{m1}$. The communication pathway $h_{11}$ represents a communication pathway from the transmit antenna 108.1 to the receive antenna 110.1, the communication pathway $h_{21}$ represents a communication pathway from the transmit antenna 108.2 to the receive antenna 110.1, and the communication pathway $h_{m1}$ represents a communication pathway from the transmit antenna 108.$m$ to the receive antenna 110.1. As another example, the receive antenna 110.2 observes the multiple parallel data streams over communication pathways $h_{12}$, $h_{22}$, and $h_{m2}$. The communication pathway $h_{12}$ represents a communication pathway from the transmit antenna 108.1 to the receive antenna 110.2, the communication pathway $h_{22}$ represents a communication pathway from the transmit antenna 108.2 to the receive antenna 110.2, and the communication pathway $h_{m2}$ represents a communication pathway from the transmit antenna 108.$m$ to the receive antenna 110.2. As a further example, the receive antenna 110.$n$ observes the multiple parallel data streams over communication pathways $h_{1n}$, $h_{2n}$, and $h_{mn}$. The communication pathway $h_{11}$ represents a communication pathway from the transmit antenna 108.1 to the receive antenna 110.$n$, the communication pathway $h_{2n}$ represents a communication pathway from the transmit antenna 108.2 to the receive antenna 110.$n$, and the communication pathway $h_{mn}$ represents a communication pathway from the transmit antenna 108.$m$ to the receive antenna 110.$n$.

In some situations, a number of the multiple transmit antennas 108.1 through 108.$m$ can be similar to a number of the multiple receive antennas 110.1 through 110.$n$. In other situations, the number of the multiple transmit antennas 108.1 through 108.$m$ can differ from the number of the multiple receive antennas 110.1 through 110.$n$.

Often times, the multiple transmit antennas 108.1 through 108.$m$ and/or the multiple receive antennas 110.1 through 110.$n$ represent elements of one or more transmitting arrays and/or one or more receiving arrays, respectively. Each of the one or more transmitting arrays and/or the one or more receiving arrays can include one or more of the multiple transmit antennas 108.1 through 108.*m* and/or the multiple receive antennas 110.1 through 110.*n*.

Figure 2:
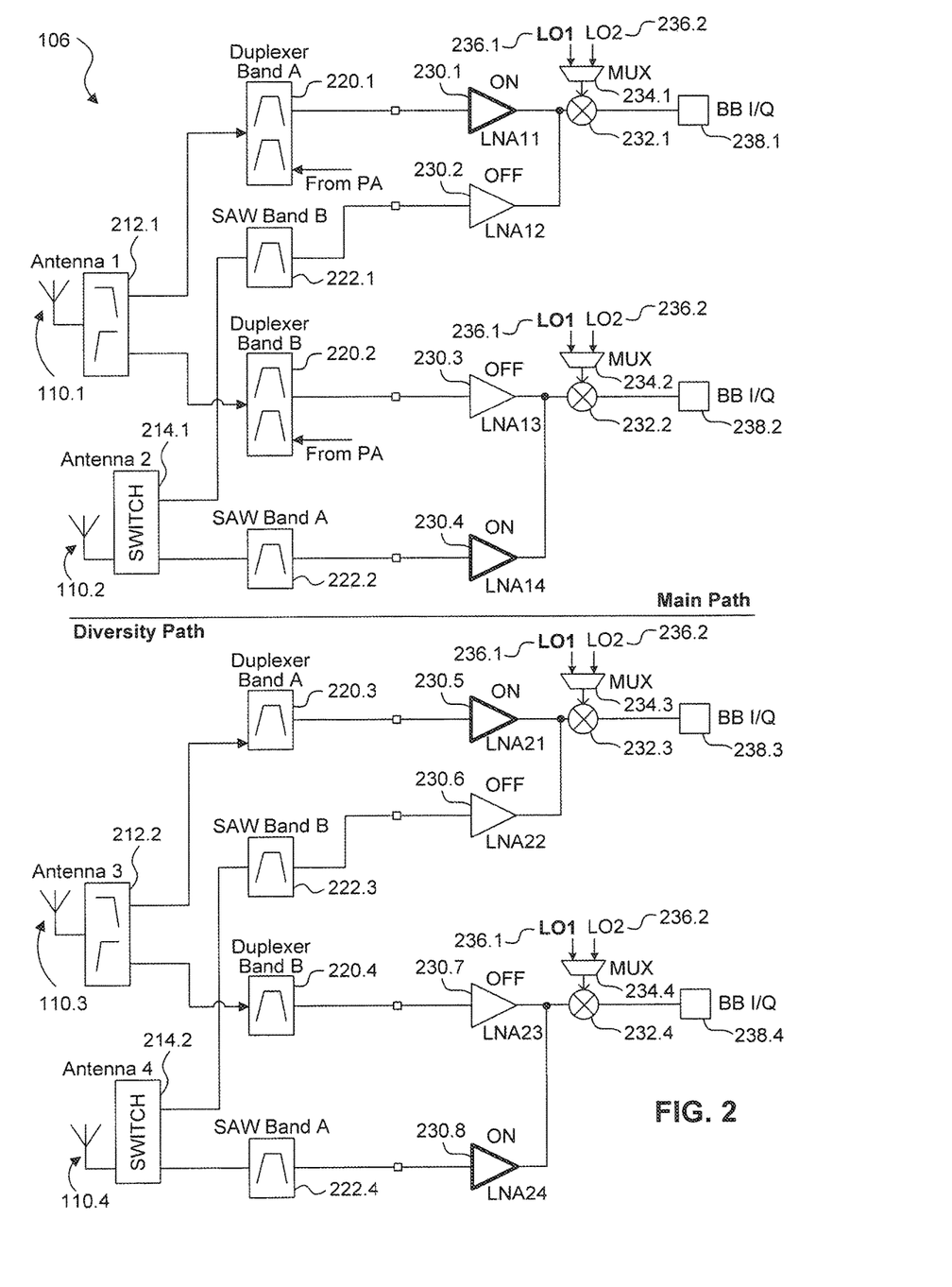
FIG. 2 illustrates a communication transceiver in accordance with an exemplary embodiment of the present disclosure.

FIG. 2 illustrates a communication transceiver 106 according to an exemplary embodiment of the present disclosure. In an exemplary embodiment, the communication transceiver 106 includes a plurality of antennas 110.1 through 110.4, where antennas 110.1 and 110.2 form a main path section and antennas 110.3 and 110.4 form a diversity path section. Communication transceiver 106 further includes diplexers 212.1 and 212.2, switching modules 214.1 and 214.2, duplexers 220.1 and 220.2, surface acoustic wave (SAW) filter modules 222.1 to 222.6, low-noise amplifiers (LNA) 230.1 to 230.8, mixers 232.1 to 231.4, multiplexers 234.1 to 234.4, local oscillators (LU) 236.1 and 236.2, and baseband modules 238.1 to 238.4. The quantities of each of these components is not limited to the example quantities of the exemplary embodiments of this disclosure, as one of ordinary skill in the relevant arts would understand that the quantities can be adjusted accordingly based on the scale and implementation of the communication transceiver 106.

For the purpose of this disclosure, the main path section of the communication transceiver 106 will be described in more detail below. As illustrated in FIG. 2, the corresponding diversity path shares many common elements and features with the main path of the communication transceiver 106, and therefore the discussion of these common elements is omitted for brevity.

In the main path section, antenna 110.1 is communicatively and electrically coupled to a diplexer 212.1 and antenna 110.2 is communicatively and electrically coupled to switching module 214.1. The diplexer 212.1 includes suitable logic, circuitry, and/or code that is configured to perform frequency domain multiplexing (e.g., two ports onto a single port) so as to allow two different devices to share a common communications channel (i.e., antenna 110.1). In particular, the diplexer 212.1 is connected to antenna 110.1 and to first and second duplexers 220.1 and 220.2. In operation, the diplexer 212.1 splits a data stream received by the antenna 110.1 into a first communication signal having a first frequency band and a second communication signal having a second frequency band. For example, the diplexer 212.1 can split the received data stream into a first portion that is within the first frequency band (e.g., Band A) and a second portion that is within the second frequency band (e.g., Band B), and provide the first and second portions to the duplexer 220.1 and 220.2, respectively. In an exemplary embodiment, frequency Band A is, for example, 1.5 to 2.7 GHz and frequency Band B is, for example, less than or equal to 1 GHz. The frequencies and/or frequency band ranges are not limited to these exemplary frequencies, as the frequencies can be any frequency or frequency band range that would be apparent to those of ordinary skill in the relevant arts without departing from the spirit or scope of the present disclosure.

The duplexers 220.1 to 220.4 include suitable logic, circuitry, and/or code that is configured to allow bi-directional (duplex) communication over a single path to/from two devices (e.g., transmitter and receiver). That is, the duplexers 220 isolate the two devices while permitting them to share a path (e.g., common antenna 110.1). In an exemplary embodiment, the duplexers 220 are configured to allow two different devices (e.g. an LNA 230 and the output of power amplifier (PA) configured to transmit the output data stream of the communication transceiver 106) to share a common communications channel (e.g., antenna 110.1). That is, the duplexer 220.1 is connected to the LNA 230.1, the output of the PA, and diplexer 212.1, and the duplexer 220.2 is connected to LNA 230.3, the output of the PA, and the diplexer 212.1.

The low-noise amplifiers (LNA) 230.1 to 230.8 include suitable logic, circuitry, and/or code that is configured to amplify a received input signal and to output the amplified input signal that has been amplified by a predetermined gain value. In an exemplary embodiment, the input of each LNA 230 is connected to an antenna 110 (with one or more intermediate components), and the output of the connected to a baseband module 238 via a mixer 232 at the LNA's output. That is, the LNA 230 receives an input signal from an antenna 110 and outputs an amplified output signal to a mixer 232. In an exemplary embodiment, the LNAs 230 can be configured to operate on specific frequencies and/or frequency bands. In operation, the transceiver 106 is then configured to utilize a predetermined number of LNAs 230 corresponding to one or more desired frequencies and/or frequency bands. These LNAs 230 are then connected to respective antenna 110 while unused LNAs can be left disconnected. This allows for the communication transceiver 106 to be customizable so as to be operable on one or more frequencies and/or frequency bands.

Mixers 232 each include suitable logic, circuitry, and/or code that is configured to mix two input signals and to generate an output signal based on the two input signals. As illustrated in FIG. 2, each mixer 232 can be configured to mix the output of an LNA 230 with the output of a multiplexer 234 to generate an output signal that is provided to a corresponding the baseband module 238. Each multiplexer 234 includes suitable logic, circuitry, and/or code that is configured to selectively output the signals generated by the local oscillators 236.1 and 236.2 based on the mode of operation of the communication transceiver 106 (e.g., Band A 4× MIMO, Band B 4× MIMO, Carrier Aggregation mode). Each oscillator 236 includes suitable logic, circuitry, and/or code that is configured to generate an output signal at a specific frequency or specific frequency band (e.g., Band A or Band B), which may be predetermined or controlled based on an input signal (e.g., the oscillators 236 may be voltage-controlled oscillators in a frequency synthesizer). For example, local oscillator 236.1 can be configured to generate an output signal at frequency Band A, and local oscillator 236.2 can be configured to generate an output signal at frequency Band B. The mixer 232, multiplexer 234 and oscillators 236 cooperatively operate to mix a received signal (e.g., output signal from a corresponding LNA 230) with an oscillator signal to down-convert a desired carrier in the received signal to baseband or some non-zero intermediate frequency (IF) for further processing.

Each of the baseband modules 236 include suitable logic, circuitry, and/or code that is configured to perform digital signal processing, on signals received from respective mixers 232. The digital signal processing can include, for example, demodulation, modulation, interpolation, frequency shifting, encoding, decoding, filtering, analog-to-digital conversion (ADC), digital-to-analog conversion (DAC), in-phase and quadrature-phase (I/Q) signal processing, and/or any other suitable digital signal processing that will be apparent to those skilled in the relevant art(s) without departing from the spirit and scope of the present invention.

The second antenna (e.g., antenna 110.2) of the main path is communicatively and electrically coupled to switching module 214.1. The switching module 214.1 includes suitable logic, circuitry, and/or code that is configured to selectively connect the antenna 110.2 to the surface acoustic wave (SAW) filter module 222.1 and the SAW filter module 222.2. The SAW filter modules 222 include suitable logic, circuitry, and/or code that is configured to perform surface acoustic wave (SAW) filtering on signals received from the switching module 214.1 to generate and output a SAW filtered signal. The outputs of the SAW filter modules 222.1 and 222.2 are connected to inputs of LNAs 230.2 and 230.4, respectively. The outputs of LNAs 230.2 and 230.4 are connected to the inputs of mixers 232.1 and 232.2, respectively. As illustrated in FIG. 2, the mixers 232 are each connected to two LNAs 230 and a multiplexer 234. In operation, as discussed in more detail below, only a single LNA of each pair is activated at any particular time; therefore, each mixer 232 receives two inputs at any particular time—the output of a multiplexer 234 and the output of a single LNA 230.

As discussed above, the components and their interconnections within the diversity path section of the communication transceiver 106 share many common elements and features with the components of the main path section. Therefore the discussion of these common elements has been omitted for brevity. It should also be appreciated that the discussion of operation of the various components of the main path section is similar to the corresponding components of the diversity path section. The discussion of these similar components and their corresponding operations has also been omitted for brevity.

In an exemplary embodiment, the communication transceiver 106 is configured to operate in multiple communication modes, including, for example, a 4× Multiple-input Multiple-output (MIMO) mode at a first frequency band, a 4× Multiple-input Multiple-output (MIMO) mode at a second frequency band, and a 2× MIMO with downlink Carrier Aggregation (CA) mode utilizing both the first and second frequency bands. This exemplary embodiment provides an implementation having the flexibility and benefits of a single device that is configured to operate in three communication modes, including a 4× Multiple-input Multiple-output (MIMO) mode at a first frequency band, a 4× Multiple-input Multiple-output (MIMO) mode at a second frequency band, and a 2× MIMO with downlink Carrier Aggregation (CA) mode utilizing both the first and second frequency bands.

FIG. 2 illustrates an exemplary configuration of the communication transceiver 106 in the 4× Multiple-input Multiple-output (MIMO) mode at a first frequency band (e.g., Band A). In the 4× MIMO mode, the communication transceiver 106 is configured to utilize four antennas 110.1 to 110.4, where antennas 110.1 and 110.2 are configured as main path antennas and corresponding antennas 110.3 and 110.4 are configured as diversity path antennas. As illustrated in FIG. 2, the communication transceiver 106 is configured to operate on the first frequency band (e.g. Band A) that is associated with the local oscillator 236.1. In this configuration, the multiplexers 234.1 to 234.4 are configured to output the signal generated by the local oscillator 236.1 (e.g., LO1) to corresponding mixers 232.1 to 232.4. LNAs 230.1, 230.4, 230.5 and 230.8 are activated while LNAs 230.2, 230.3, 230.6, and 230.7 are deactivated. Further, switching modules 214.1 and 214.2 are configured to connect antennas 110.2 and 110.4 to SAW filter modules 222.2 and 222.4, respectively. That is, the communication transceiver is configured such that: (1) antenna 110.1 is connected to the baseband module 238.1 via diplexer 212.1, duplexer 220.1, LNA 230.1 and mixer 232.1; (2) antenna 110.2 is connected to the baseband module 238.2 via switching module 214.1, SAW filter module 222.2, LNA 230.4 and mixer 232.2; (3) antenna 110.3 is connected to the baseband module 238.3 via diplexer 212.2, SAW filter module 222.5, LNA 230.5 and mixer 232.3; and (4) antenna 110.4 is connected to the baseband module 238.4 via switching module 214.2, SAW filter module 222.4, LNA 230.8 and mixer 232.4.

Figure 3:
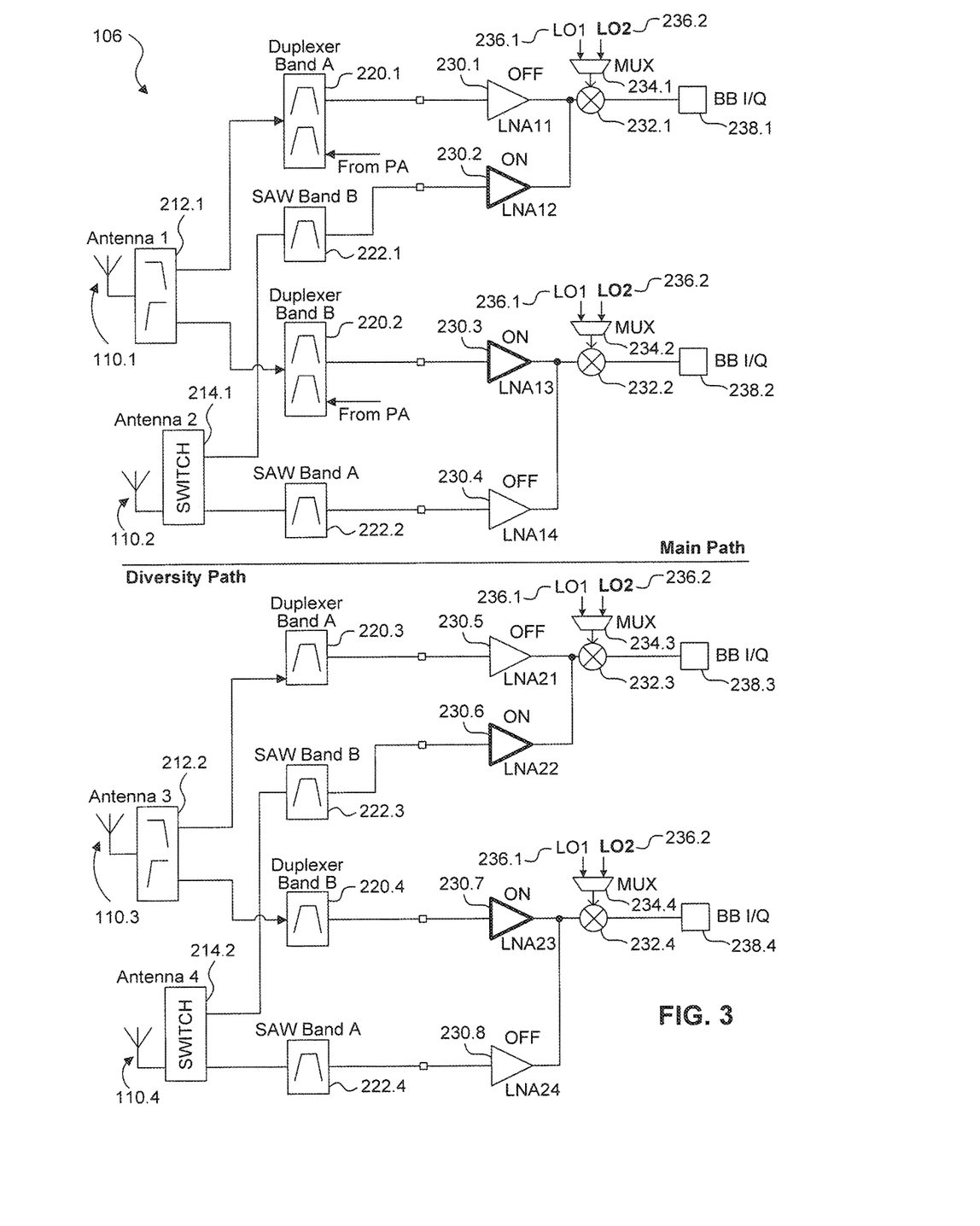
FIG. 3 illustrates a communication transceiver in accordance with an exemplary embodiment of the present disclosure.

FIG. 3 illustrates an exemplary configuration of the communication transceiver 106 in the 4× Multiple-input Multiple-output (MIMO) mode at a second frequency band (e.g., Band B). Similar to the configuration of the communication transceiver 106 in FIG. 2, the communication transceiver 106 is configured to utilize four antennas 110.1 to 110.4, where antennas 110.1 and 110.2 are configured as main path antennas and corresponding antennas 110.3 and 110.4 are configured as diversity path antennas.

As illustrated in FIG. 3, the communication transceiver 106 is configured to operate on the second frequency band (e.g. Band B) that is associated with the local oscillator 236.2. In this configuration, the multiplexers 234.1 to 234.4 are configured to output the signal generated by the local oscillator 236.2 (e.g., LO2) to corresponding mixers 232.1 to 232.4. LNAs 230.2, 230.3, 230.6, and 230.7 are activated while LNAs 230.1, 230.4, 230.5 and 230.8 are deactivated. Further, switching modules 214.1 and 214.2 are configured to connect antennas 110.2 and 110.4 to SAW filter modules 222.1 and 222.3, respectively. That is, the communication transceiver is configured such that: (1) antenna 110.1 is connected to the baseband module 238.2 via diplexer 212.1, duplexer 220.2. LNA 230.3 and mixer 232.2; (2) antenna 110.2 is connected to the baseband module 238.1 via switching module 214.1, SAW filter module 222.1, LNA 230.2 and mixer 232.1; (3) antenna 110.3 is connected to the baseband module 238.4 via diplexer 212.2, SAW filter module 222.6, LNA 230.7 and mixer 232.4; and (4) antenna 110.4 is connected to the baseband module 238.3 via switching module 214.2, SAW filter module 222.3. LNA 230.6 and mixer 232.3.

Figure 4:
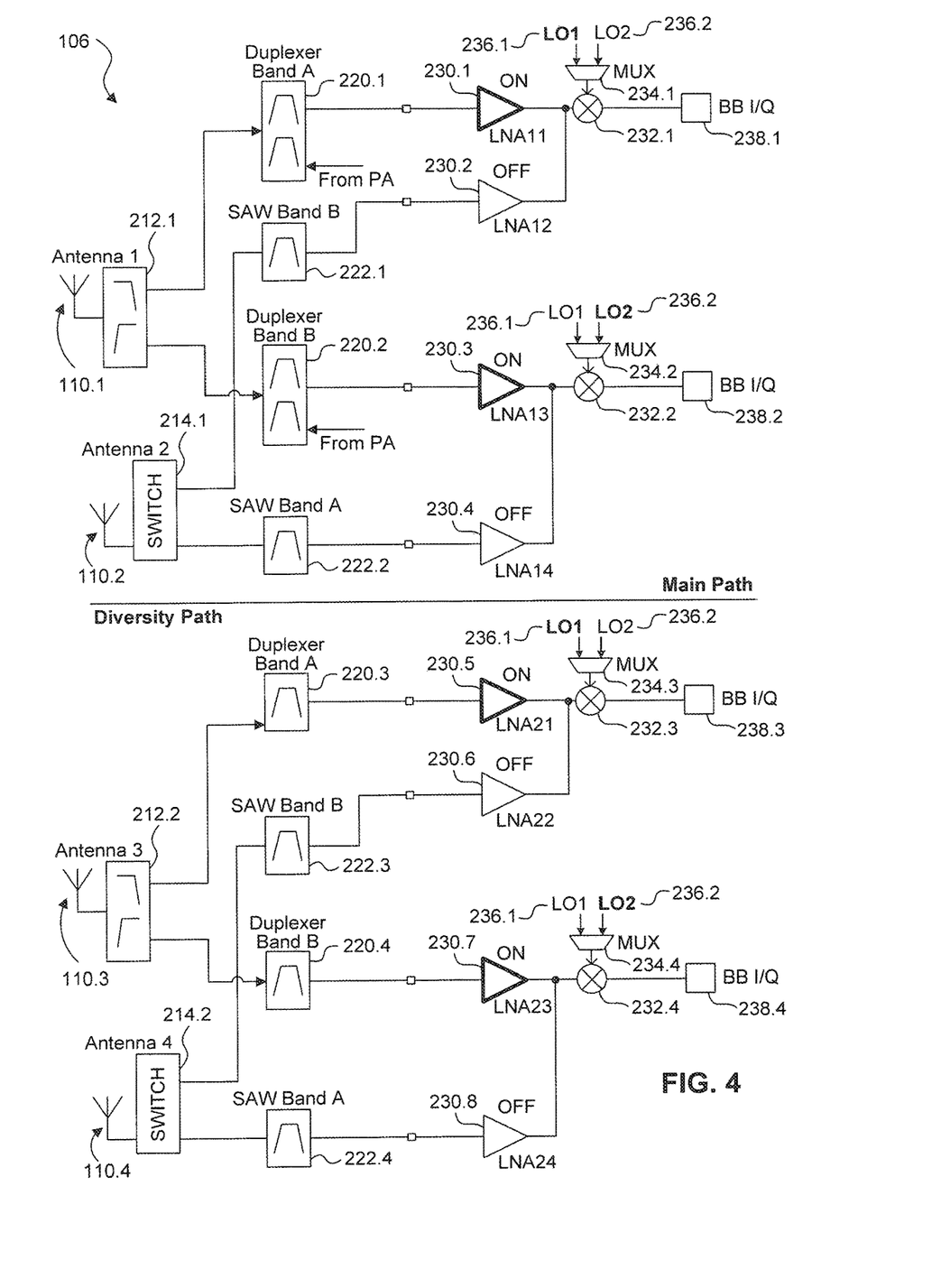
FIG. 4 illustrates a communication transceiver in accordance with an exemplary embodiment of the present disclosure.

FIG. 4 illustrates an exemplary configuration of the communication transceiver 106 in the 2× Multiple-input Multiple-output (MIMO) with downlink Carrier Aggregation (CA) mode utilizing both the first and second frequency bands (e.g., Bands A and B). In the 2× MIMO with downlink CA mode, the communication transceiver 106 is configured to utilize two antennas 110.1 and 110.3, where antenna 110.1 is configured as main path antenna and corresponding antennas 110.3 is configured as diversity path antenna.

As illustrated in FIG. 4, the communication transceiver 106 is configured to operate on both the first and second frequency bands (e.g., Bands A and B) that are associated with the local oscillators 236.1 and 236.2, respectively. In this configuration, the multiplexers 234.1 and 234.3 are configured to output the signal generated by the local oscillator 236.1 (e.g., LO1) to corresponding mixers 232.1 and 232.3 while multiplexers 234.2 and 234.4 are configured to output the signal generated by the local oscillator 236.2 (e.g., LO2) to corresponding mixers 232.2 and 232.4, LNAs 230.1, 230.3, 230.5, and 230.7 are activated while LNAs 230.2, 230.4, 230.6 and 230.8 are deactivated. Switching modules 214.1 and 214.2 are also deactivated as antennas 110.2 and 110.4 are not utilized in the 2× MIMO with downlink CA configuration.

In the 2× MIMO with downlink CA configuration mode, the communication transceiver 106 is configured such that: (1) antenna 110.1 is connected to the baseband module 238.1 via diplexer 212.1, duplexer 220.1, LNA 230.1 and mixer 232.1; (2) antenna 110.1 is also connected to the baseband module 238.2 via diplexer 212.1, duplexer 220.2, LNA 230.3 and mixer 232.2; (3) antenna 110.3 is connected to the baseband module 238.3 via diplexer 212.2, SAW filter module 222.5, LNA 230.5 and mixer 232.3; and (4) antenna 110.3 is also connected to the baseband module 238.4 via diplexer 212.2, SAW filter module 222.6, LNA 230.7 and mixer 232.4. That is, the baseband modules 238.1 and 238.3 process signals that utilize the first frequency band and that are received via antennas 110.1 and 110.3, while the baseband modules 238.2 and 238.4 process signals that utilize the second frequency band and that are received via antennas 110.1 and 110.3.

In operation, the communication transceiver 106 can be configured to switch between various communication modes. The mode selection can be controlled by one or more processors (e.g., processor 704 in FIG. 7) implemented with or within the communication transceiver 106 and/or the communication transceiver 102. The one or more processors can be configured to monitor the available operating modes, network conditions, quality of service (QOS), and/or user and/or service provider mode selection and/or preference, to provide some examples, and to instruct the various components of the communication transceiver 106 (e.g., switching modules 214, multiplexers 234, LNAs 230, etc.) to select between the various antenna and/or frequency configurations. The operational mode selection can be governed by the communication network service provider (e.g., communication transceiver 102) and/or the communication transceiver 106.

In an exemplary embodiment, the communication transceiver 106 can be configured to operate in the 4× MIMO mode or the 2× MIMO with CA mode based on the network conditions and/or quality of service (QOS) of the 4× MIMO connection and/or 2× MIMO with CA connection. For example, the communication transceiver 106 can be configured so as to prefer to operate in the 4× MIMO mode, and to switch to the 2× MIMO with CA mode if the network conditions and/or QOS of the 4× MIMO connection falls below a predetermined threshold. Once the network conditions and/or QOS allow, the communication transceiver 106 can return to the 4× MIMO mode. In this configuration, the communication transceiver 106 can provide the desired communication network environment, network accessibility and/or QOS, while only using the additional frequency spectrum allocated for the 2× MIMO with CA mode when necessary to maintain the desired communication network environment, network accessibility and/or QOS. For example, the communication transceiver 106 can be configured to switch from the 4× MIMO mode to the 2× MIMO with CA mode if the 4× MIMO mode cannot provide sufficient bandwidth, data throughput and/or QOS to provide some examples, and return to the 4× MIMO mode once sufficient bandwidth, data throughput and/or QOS can be provided by the 4× MIMO communication environment. It should be appreciated that the communication transceiver 106 can alternatively be configured to operate with preference to the 2× MIMO with CA mode so as to switch to the 4× MIMO mode when necessary to achieve a desired communication environment. Similarly, the communication transceiver 106 can be configured to initially operate in any of the various modes, to switch to an alternative mode when necessary, and to remaining in the current operating mode until network conditions, QOS, etc. necessitate a switch to an alternative operating mode.

When operating in the 4× MIMO mode, the communication transceiver 106 can also be configured to monitor the network conditions and/or QOS of the various available frequency bands (e.g., Bands A and B), and selectively choose between the available frequency bands based on the network conditions and/or QOS. Here, the communication transceiver 106 can then be configured to switch to the 2× MIMO with CA mode when the desired communication network environment, network accessibility and/or QOS cannot be achieved while operating in one or more of the available 4× MIMO modes.

In an exemplary embodiment, the communication transceiver 106 can be configured with a user override function that allows for selection of an operating mode regardless of the network conditions and/or QOS associated with the selected mode. Here, the communication transceiver 106 is limited to the one or more designated operational modes. For example, the communication transceiver 106 can be configured to receive a user input corresponding to one or more designated operational modes in which the communication transceiver 106 is to operate.

Similarly, the service provider (e.g., communication transceiver 102) can be configured to designate one or more operational modes in which the communication transceiver 106 is permitted to operate in. Here, the designation can be communicated to the communication transceiver 106 by the service provider.

In an exemplary embodiment, the communication transceiver 106 and/or the service provider can be configured to select the operational mode based on one or more geographical and/or temporal factors. The geographical and/or temporal factors can include orientation, compass coordinates (e.g., longitude and/or latitude, azimuth, altitude, pitch, roll, yaw, etc.), velocity, acceleration, time, and/or any other geographical and/or temporal factor to provide some examples. For example, the communication transceiver 106 and/or service provider can be configured to select a specific operational mode based on the location of the communication transceiver 106, time of day, and/or the current date to provide some examples.

In an exemplary embodiment, the communication transceiver 106 and/or the service provider can be configured to select the operational mode based on the available power source(s) of the communication transceiver 106. For example, if the communication transceiver 106 is operating on battery power, the operational mode selection can be made based on the remaining battery life (e.g., the remaining ampere-hours of the battery). Typically, the 4× MIMO mode can offer a more efficient operation (e.g., consumes less power) as the radio frequency integrated circuit (RFIC) will consume less power when operating in the 4× MIMO mode as compared to the 2× MIMO with CA mode. That is, because the 4× MIMO mode utilizes only one of the local oscillators 236, so that only the phase lock loop (PLL) corresponding to the active oscillator 236 is consuming power. Conversely, when operating in the 2× MIMO with CA mode, respective PLLs of both local oscillators 236 are actively operating, which can increase the overall power consumption of the communication transceiver 106.

The communication transceiver 106 and/or the service provider can also be configured to operate in a power saving mode that designates one or more available modes of operation in which the communication transceiver 106 is allowed to operate in. Here, the modes of operation can be limited to conserve power regardless of the available power sources. For example, if the power saving mode is enabled, the communication transceiver 106 can be limited to operating in, for example, the 4× MIMO mode because the 4× MIMO mode typically consumes less power than the 2× MIMO with CA mode.

In exemplary embodiment, the communication transceiver 106 and/or the service provide can be configured to select the operational mode based on one or more active applications being performed by the communication transceiver 106. In particular, the communication transceiver 106 can perform applications that have bandwidth and/or data throughput requirements that vary based on the application. For example, the communication transceiver 106 can receive data corresponding to live video streaming, which typically requires high bandwidth and/or data throughput requirements, or data corresponding to internet browsing which typically requires low bandwidth and/or data throughput requirements to provide some examples. Therefore, if the communication transceiver 106 is executing an application that requires high bandwidth and/or data throughput requirements, the communication transceiver 106 can select to operate in, for example, the 2× MIMO with CA mode as this mode generally provides higher data throughput.

The communication transceiver 106 and/or the service provider can also be configured to select the operational mode based on a user account associated with the communication transceiver 106. For example, the service provider may offer premium services that include the availability of the 2× MIMO with CA mode in addition to the standard 4× MIMO modes in a service agreement. Here, the communication transceiver 106 and/or the service provider can select a premium network mode (e.g., 2× MIMO with CA) based on whether the user account associated with the communication transceiver 106 includes the premium network functionality (e.g., whether the user pays for the premium service).

Figure 5:
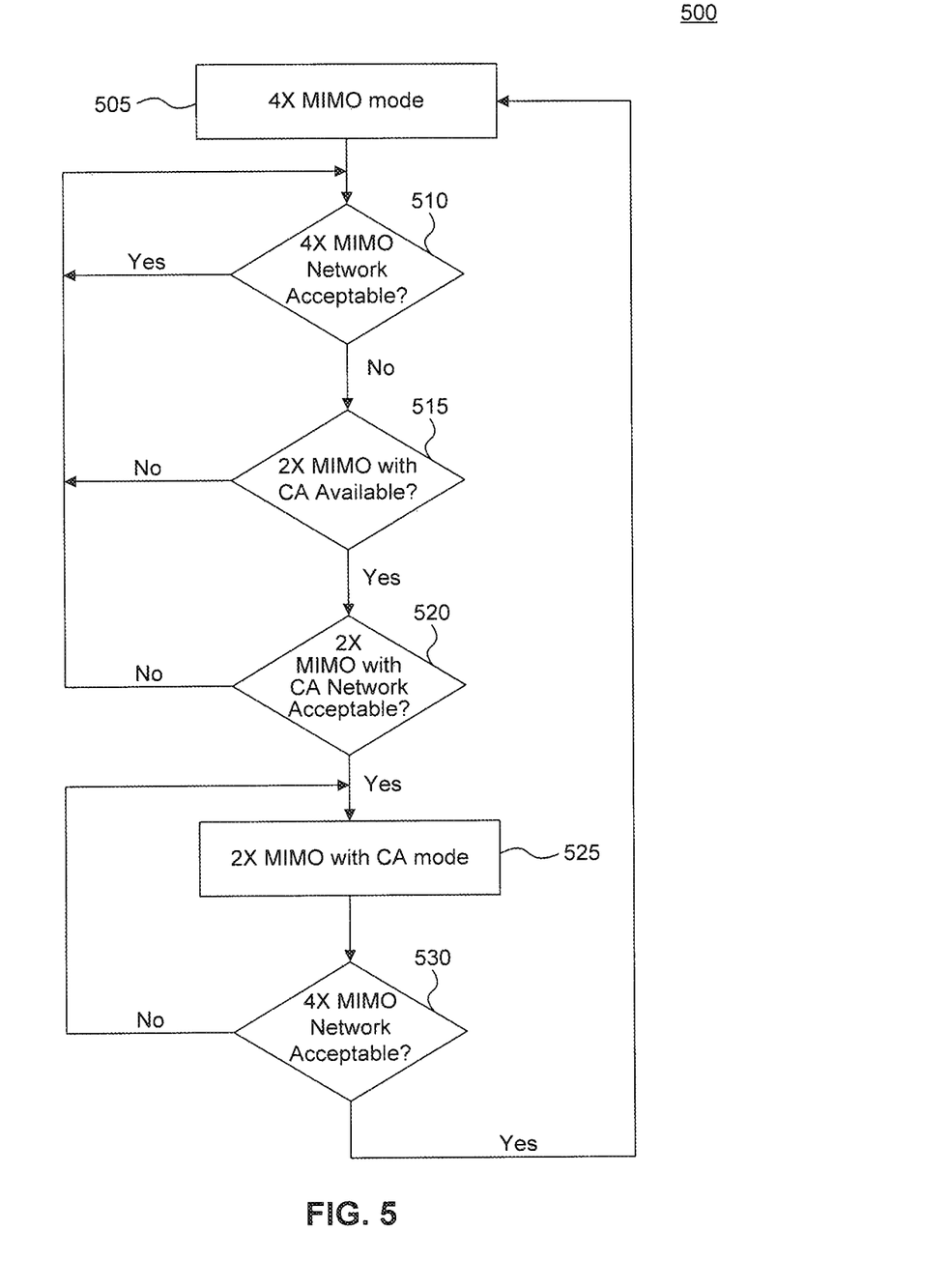
FIG. 5 illustrates a flowchart of a data transfer method in accordance with an exemplary embodiment of the present disclosure.

FIG. 5 illustrates a flowchart 500 of a communication network mode selection method in accordance with an exemplary embodiment of the present disclosure. The method of flowchart 500 is described with continued reference to FIGS. 1-4 and 7. The steps of the method of flowchart 500 are not limited to the order described below, and the various steps may be performed in a different order. Further, two or more steps of the method of flowchart 500 may be performed simultaneously with each other.

The method of flowchart 500 begins at step 505, where the communication transceiver 106 is configured to operate in the 4× MIMO mode. For example, one or more processors (e.g., processor 704 in FIG. 7) implemented with the communication transceiver 106 can be configured to instruct the various components of the communication transceiver 106 (e.g., switching modules 214, multiplexers 234, LNAs 230 etc.) to select the antenna and/or frequency configuration associated with the 4× MIMO mode. In an exemplary embodiment, the selection of the 4× MIMO mode can include determining available frequency bands in which the communication transceiver 106 is configured to operate in the 4× MIMO mode, and monitoring network conditions and/or QOS of the available frequency bands (e.g., Bands A and B). Based on this monitoring, the communication transceiver 106 can be configured to selectively choose an available frequency band that provides a better communication environment (e.g., has better network conditions and/or provides a better QOS).

After step 505, the flowchart 500 transitions to step 510, where the communication transceiver 106 is configured to analyze, for example, the network conditions, QOS bandwidth and/or data throughput to determine if the 4× MIMO mode provides the desired communication environment. If the communication transceiver 106 determines that the current 4× MIMO mode provides the desired communication environment (YES at step 510), the flowchart 500 returns to step 510. Otherwise (NO at step 510), the flowchart 500 transitions to step 515.

At step 515, the communication transceiver 106 determines if the 2× MIMO with CA mode is available. For example, the communication transceiver 106 and/or the service provider can determine if the additional frequency spectrum is available at the location of the communication transceiver 106 and if the communication transceiver 106 can be configured to operate in the 2× MIMO with CA mode. This determination can also include, for example, determining if the communication transceiver 106 is operating in a power saving mode (e.g., battery saving mode), and/or if the service agreement (user account) associated with communication transceiver 106 includes premium network services (i.e., the user is a premium user) to provide some examples.

If the communication transceiver 106 determines that the 2× MIMO with CA mode is available (YES at step 515), the flowchart 500 transitions to step 520. Otherwise (NO at step 515), the flowchart 500 returns to step 510.

At step 520, the communication transceiver 106 is configured to analyze, for example, the network conditions, QOS bandwidth and/or data throughput to determine if the 2× MIMO with CA mode provides the desired communication environment. If the communication transceiver 106 determines that the current 2× MIMO with CA mode provides the desired communication environment (YES at step 520), the flowchart 500 transitions to step 525. Otherwise (NO at step 520), the flowchart 500 returns to step 510.

At step 525, the communication transceiver 106 is configured to operate in the 2× MIMO with CA mode. For example, one or more processors (e.g., processor 704 in FIG. 7) implemented with the communication transceiver 106 can be configured to instruct the various components of the communication transceiver 106 (e.g., switching modules 214, multiplexers 234, LNAs 230 etc.) to select the antenna and/or frequency configuration associated with the 2× MIMO with CA.

After step 525, the flowchart 500 transitions to step 530, where the communication transceiver 106 is configured to analyze, for example, the network conditions, CMOS bandwidth and/or data throughput to determine if the 4× MIMO mode provides the desired communication environment. If so (YES at step 530), the flowchart 500 transitions to step 505, where the communication transceiver 106 is configured operate in the 4× MIMO mode. Otherwise (NO at step 530), the flowchart 500 returns to step 530 so as to recheck the status of the 4× MIMO communication environment.

Figure 6:
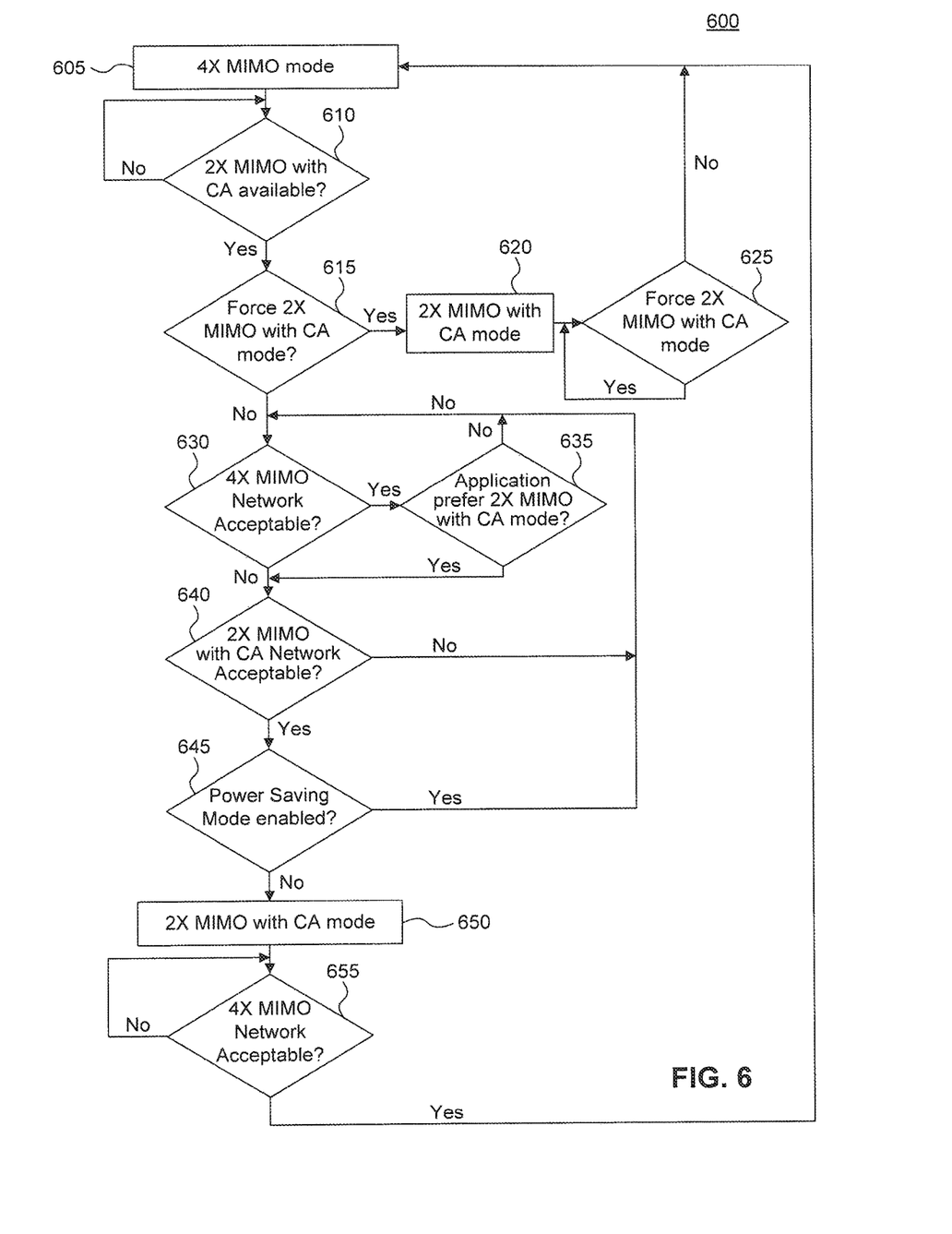
FIG. 6 illustrates a flowchart of a data transfer method in accordance with an exemplary embodiment of the present disclosure.

FIG. 6 illustrates a flowchart 600 of a communication network mode selection method in accordance with an exemplary embodiment of the present disclosure. The method of flowchart 600 is described with continued reference to FIGS. 1-5 and 7. The steps of the method of flowchart 600 are not limited to the order described below, and the various steps may be performed in a different order. Further, two or more steps of the method of flowchart 600 may be performed simultaneously with each other.

Figure 7:
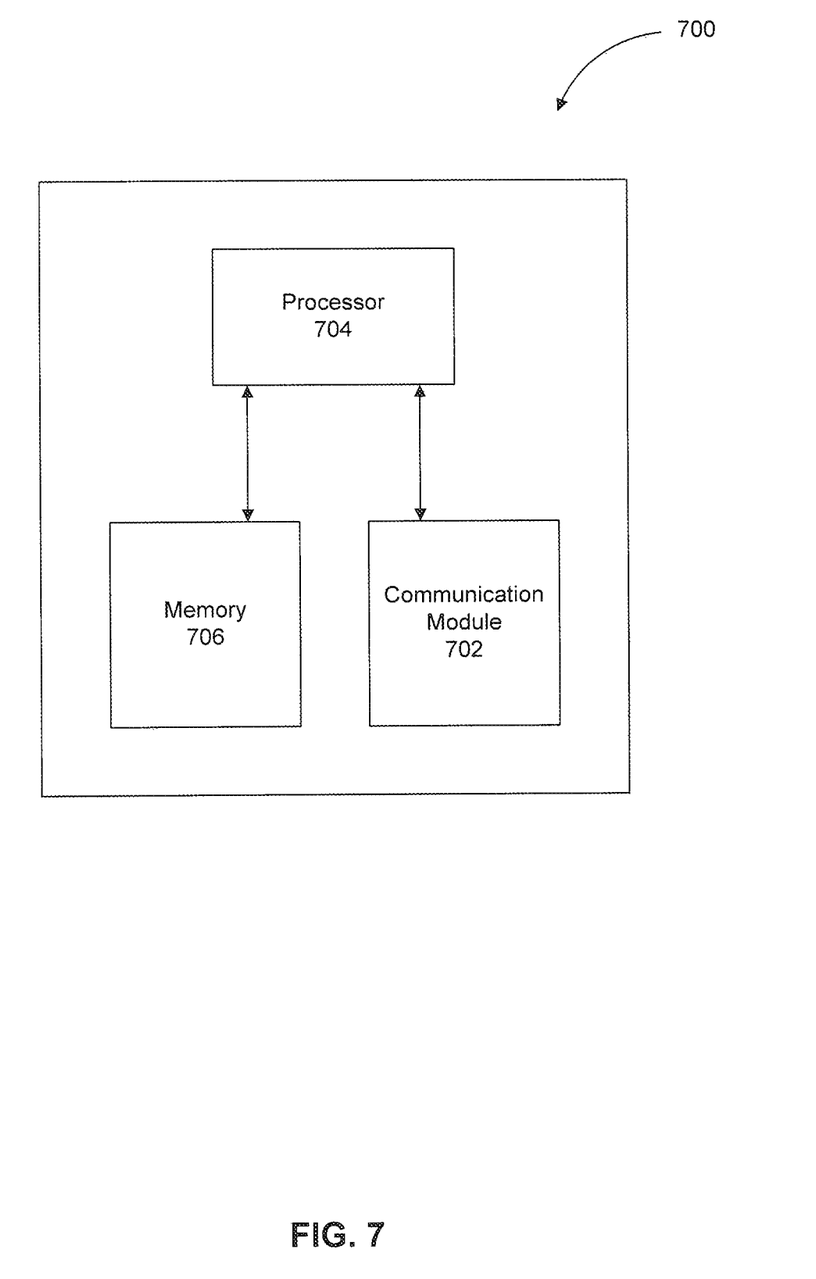
FIG. 7 illustrates a communication device in accordance with an exemplary embodiment of the present disclosure.

The method of flowchart 600 begins at step 605, where the communication transceiver 106 is configured to operate in the 4× MIMO mode. For example, one or more processors (e.g., processor 704 in. FIG. 7) implemented with the communication transceiver 106 can be configured to instruct the various components of the communication transceiver 106 (e.g., switching modules 214, multiplexers 234, LNAs 230 etc.) to select the antenna and/or frequency configuration associated with the 4× MIMO mode. In an exemplary embodiment, the selection of the 4× MIMO mode can include determining available frequency bands in which the communication transceiver 106 is configured to operate in the 4× MIMO mode, and monitoring network conditions and/or QOS of the available frequency bands (e.g., Bands A and B). Based on this monitoring, the communication transceiver 106 can be configured to selectively choose an available frequency band that provides a better communication environment (e.g., has better network conditions and/or provides a better QOS).

After step 605, the flowchart 600 transitions to step 610, where, the communication transceiver 106 determines if the 2× MIMO with CA mode is available. For example, the communication transceiver 106 and/or the service provider can determine if the additional frequency spectrum is available at the location of the communication transceiver 106 and if the communication transceiver 106 can be configured to operate in the 2× MIMO with CA mode. This determination can also include, for example, the communication transceiver 106 sending a message to the service provider inquiring as to the availability of the available frequency spectrum, the service provider sending a message to the communication transceiver 106 notifying the communication transceiver 106 of the available frequency spectrum, determining if the communication transceiver 106 is operating a Battery saving (e.g., power saving) mode, and/or if the service agreement (user account) associated with communication transceiver 106 includes premium network services (i.e., the user is a premium user) to provide some examples.

If the communication transceiver 106 determines that the 2× MIMO with CA mode is available (YES at step 610), the flowchart 600 transitions to step 615. Otherwise (NO at step 610), the flowchart 600 returns to step 610.

At step 615, the communication transceiver 106 is configured to determine if a network override function has been enabled. The network override function allows the communication transceiver 106 and/or the service provider to select or restrict one or more network modes regardless of the communication environments of the various communication networks. For example, the communication transceiver 106 can be configured to receive a user input corresponding to one or more designated operational modes in which the communication transceiver 106 is to operate.

Here, for example, the network override function can be enabled so that the communication transceiver 106 is forced to operate in the 2× MIMO with CA mode. That is, if the network override function is enabled (YES at step 615), the flowchart 600 transitions to step 620, where the communication transceiver 106 is configured to operate in the 2× MIMO with CA mode. Otherwise (NO at step 615), the flowchart 600 transitions to step 630.

After step 620, the flowchart 600 transitions to step 625, where the communication transceiver 106 is configured to determine if a network override function has remained enabled. If so, the flowchart 600 returns to step 625 to re-check if the network override has remained enabled. If the network override function has been disabled (NO at step 625), the flowchart 600 returns to step 605.

At step 630, the communication transceiver 106 is configured to analyze, for example, the network conditions, (SOS bandwidth and/or data throughput to determine if the 4× MIMO mode provides the desired communication environment. If the communication transceiver 106 determines that the current 4× MIMO mode provides the desired communication environment (YES at step 630), the flowchart 600 transitions to step 635. Otherwise (NO at step 630), the flowchart 600 transitions to step 640.

At step 635, the communication transceiver 106 and/or the service provider can be configured to select the operational mode based on the bandwidth and/or data throughput requirements of one or more active applications being performed by the communication transceiver 106. For example, the communication transceiver 106 can determine if one or more active applications prefers to operate in, for example, the 2× MIMO with CA mode as this mode generally provides higher data throughput. If the communication transceiver and/or the service provider deter mine that one or more active applications prefers that the communication transceiver 106 operate in the 2× MIMO with CA mode (YES at step 635), the flowchart 600 transitions to step 640. Otherwise (NO at step 635), the flowchart 600 returns to step 630 and the communication transceiver 106 continues to operate in the 4× MIMO mode for the time being.

At step 640, the communication transceiver 106 is configured to analyze, for example, the network conditions, QOS bandwidth and/or data throughput to determine if the 2× MIMO with CA mode provides the desired communication environment. If the communication transceiver 106 determines that the current 2× MIMO with CA mode provides the desired communication environment (YES at step 640), the flowchart 600 transitions to step 645. Otherwise (NO at step 640), the flowchart 600 returns to step 630 and the communication transceiver 106 continues to operate in the 4× MIMO mode for the time being.

At step 645, the communication transceiver 106 is configured to determine if the communication transceiver 106 is operating in a power saving mode. If the power saving mode is enabled (YES at step 645), the flowchart returns to step 630 and the communication transceiver 106 continues to operate in the 4× MIMO mode for the time being. If the power saving mode is disabled (NO at step 645), the flowchart 600 transitions to step 650.

At step 650, communication transceiver is configured to operate in the 2× MIMO with CA mode. For example, one or more processors (e.g., processor 704 in FIG. 7) implemented with the communication transceiver 106 can be configured to instruct the various components of the communication transceiver 106 (e.g., switching modules 214, multiplexers 234, LNAs 230 etc.) to select the antenna and/or frequency configuration associated with the 2× MIMO with CA.

After step 650, the flowchart 600 transitions to step 655, where the communication transceiver 106 is configured to analyze, for example, the network conditions, QOS bandwidth and/or data throughput to determine if the 4× MIMO mode provides the desired communication environment. If so (YES at step 655), the flowchart returns to step 605, where the communication transceiver 106 is configured operate in the 4× MIMO mode. Otherwise (NO at step 655), the flowchart 600 returns to step 655 so as to recheck the status of the 4× MIMO communication environment.

FIG. 7 illustrates a communication device 700 according to an exemplary embodiment of the present disclosure. In an exemplary embodiment, the communication device 700 includes a communication module 702, processor 704, and a memory 706.

The communication module 702 includes suitable logic, circuitry, and/or code that is configured to transmit/receive one or more data streams to/from one or more communication transceivers via a communication channel utilizing Multiple-input Multiple-output (MIMO) and/or Carrier Aggregation (CA) configurations. In an exemplary embodiment, the communication transceiver 106 described with reference to FIGS. 1-6 can be implemented as the communication module 702. More specifically, the communication transceivers 102 or 106, and their respective antennas 108/110, can be implemented in the communication module 702.

The processor 704 includes suitable logic, circuitry, and/or code that is configured to control the overall operation of the communication system 700, including controlling the selection between one or more 4× MIMO modes and 2× MIMO with CA modes in the communication module 702. Further, the processor 704 can be configured to monitor the available operating modes, network conditions, quality of service (QOS), and/or user and/or service provider mode selection and/or preference, to provide some examples, and to instruct the various components of the communication module 702 (e.g., components of communication transceiver 106, including switching modules 214, multiplexers 234, LNAs 230 etc.) to select between the various antenna and/or frequency configurations. The processor 704 is communicatively and electrically coupled to the communication module 702 and the memory 706.

The memory 706 includes suitable logic, circuitry, and/or code that is configured to store data. The data can include control logic used by the processor 704, data received by communication system 700, data that is to be transmitted by the communication system 700 and/or any other data as will be apparent to those skilled in the relevant arts. The memory 706 can be a random access memory (RAM), FLASH memory, and/or read only memory (ROM) to provide some examples. It should be appreciated that the memory 706 is not limited to these example memory types and can be any volatile and/or non-volatile memory type as will be apparent to those skilled in the relevant arts. The memory 706 can be removable, non-removable or include both removable and non-removable portions.

CONCLUSION

The aforementioned description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein, are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices and the like. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
   a first signal path, including a first low noise amplifier (LNA), configured to connect a first antenna to a first mixer;
   a first multiplexer configured to select between a first local oscillator signal and a second local oscillator signal to provide an oscillator input to the first mixer; and
   a second signal path, including a second LNA, configured to connect the first antenna to a second mixer;
   wherein one of the first LNA or the second LNA is turned ON and the other of the first LNA or the second LNA is turned OFF, to select a first Multiple-input Multiple-output (MIMO) communication mode for the communication device; and
   wherein both the first LNA and the second LNA are turned ON to select a second MIMO communication mode for the communication device.

2. The communication device of claim 1, wherein the first MIMO communication mode is a 4× MIMO communication mode and the second MIMO communication mode is a 2× MIMO communication mode with carrier aggregation (CA).

3. The communication device of claim 1, wherein during the second MIMO communication mode:
the first mixer is operational to mix a first amplified signal outputted from the first LNA with the first local oscillator signal that corresponds to a first frequency band; and
the second mixer is operational to mix a second amplified signal outputted from the second LNA with the second local oscillator signal that corresponds to a second frequency band;
wherein the first frequency band is higher in frequency than the second frequency band.

4. The communication device of claim 3, wherein during the first MIMO communication mode:
only one of the first mixer or the second mixer is operational to mix the corresponding one of the first amplified signal or the second amplified signal with the corresponding one of the first local oscillator signal or the second local oscillator signal.

5. The communication device of claim 1, wherein:
the first signal path further includes a first duplexer coupled between the first antenna and the first LNA; and
the second signal path further includes a second duplexer coupled between the first antenna and the second LNA.

6. The communication device of claim 5, wherein the first duplexer is configured to operate over a first frequency band and the second duplexer is configured to operate over a second frequency band, wherein the first frequency band is higher in frequency than the second frequency band.

7. The communication device of claim 6, wherein:
the first duplexer is configured to filter a first signal received from the first antenna to generate a first filtered signal that is limited in frequency to the first frequency band, and provide the first filtered signal to the first LNA; and
the second duplexer is configured to filter a second signal received from the first antenna to generate a second filtered signal that is limited in frequency to the second frequency band, and provide the second filtered signal to the second LNA.

8. The communication device of claim 7, further comprising:
a diplexer arranged to connect the first antenna to the first LNA via the first signal path, and to connect the first antenna to the second LNA via the second signal path;
wherein the diplexer is configured to provide the first signal to the first duplexer and the second signal to the second duplexer in response to an input signal received by the first antenna.

9. The communication device of claim 1, further comprising:
a third signal path, including a first surface acoustic wave (SAW) filter and a third LNA, configured to connect a second antenna to the first mixer; and
a fourth signal path, including a second SAW filter and a fourth LNA, configured to connect the second antenna to the second mixer.

10. The communication device of claim 9, wherein:
one of the third LNA or the fourth LNA is turned ON and the other of the third LNA or fourth LNA is turned OFF, to provide the first MIMO communication mode; and
wherein both the third LNA and the fourth LNA are turned OFF to provide the second MIMO communication mode.

11. The communication device of claim 9, further comprising a switch to selectively connect the second antenna to either the first SAW filter via the third signal path or the second SAW filter via the fourth signal path based on a selected communication mode of the communication device.

12. The communication device of claim 1, further comprising:
a second multiplexer configured to select between the first local oscillator signal and the second local oscillator signal to provide an oscillator input to the second mixer.

13. A communication device, comprising:
a first signal path, including a first low noise amplifier (LNA), configured to connect a first antenna to a first mixer;
a first multiplexer configured to select between a first local oscillator signal and a second local oscillator signal to provide an oscillator input to the first mixer;
a second signal path, including a second LNA, configured to connect the first antenna to a second mixer; and
a processor configured to control the first LNA, the second LNA, and the first multiplexer to select between a first Multiple-input Multiple-output (MIMO) communication mode or a second MIMO communication mode for operation of the communication device;
wherein the first MIMO communication mode is a 4× MIMO communication mode and the second MIMO communication mode is a 2× MIMO communication mode with carrier aggregation (CA).

14. The communication device of claim 13, wherein the processor is further configured to turn ON one of the first LNA or the second LNA and turn OFF the other of the first LNA and second LNA to provide the first MIMO communication mode for the communication device.

15. The communication device of claim 14, wherein the processor is further configured to turn ON both the first LNA and the second LNA to provide the second MIMO communication mode for the communication device.

16. The communication device of claim 13, wherein during the second MIMO communication mode:
the first mixer is operational to mix a first amplified signal output from the first LNA with the first local oscillator signal that corresponds to a first frequency band; and
the second mixer is operational to mix a second amplified signal output from the second LNA with the second local oscillator signal that corresponds to a second frequency band;
wherein the first frequency band is higher in frequency than the second frequency band.

17. The communication device of claim 16, wherein during the first MIMO communication mode:
only one of the first mixer or the second mixer is operational to mix the corresponding one of the first amplified signal or the second amplified signal with the corresponding one of the first local oscillator signal or the second local oscillator signal.

18. The communication device of claim 13, further comprising:
a third signal path, including a first surface acoustic wave (SAW) filter and a third LNA, configured to connect a second antenna to the first mixer;
a fourth signal path, including a second SAW filter and a fourth LNA, configured to connect the second antenna to the second mixer; and
a switch configured to selectively connect the second antenna to either the first SAW filter via the third signal path or the second SAW filter via the fourth signal path based on a selected communication mode of the communication device.

19. The communication device of claim 18, wherein the processor is further configured to:
- turn ON one of the third LNA or the fourth LNA and turn OFF the other of the third LNA or fourth LNA, to provide the first Multiple-input Multiple-output (MIMO) communication mode; and
- turn OFF both the third LNA and the fourth LNA to provide the second MIMO communication mode.

20. The communication device of claim 13, further comprising:
- a second multiplexer configured to select between the first local oscillator signal and the second local oscillator signal to provide an oscillator input to the second mixer.

* * * * *